US009325657B2

(12) United States Patent
Turakhia (10) Patent No.: US 9,325,657 B2
(45) Date of Patent: Apr. 26, 2016

(54) SYSTEM AND METHOD FOR CONTACT MANAGEMENT IN A NETWORK

(71) Applicant: Talk.to FZC, Ras Al Khaimah (AE)

(72) Inventor: Bhavin Turakhia, Mumbai (IN)

(73) Assignee: Talk.to FZC (AE)

( * ) Notice: Subject to any disclaimer, the term of this patent is extended or adjusted under 35 U.S.C. 154(b) by 272 days.

(21) Appl. No.: 13/929,185

(22) Filed: Jun. 27, 2013

(65) Prior Publication Data

US 2014/0289342 A1    Sep. 25, 2014

(30) Foreign Application Priority Data

Mar. 26, 2013 (IN) .......................... 1132/MUM/2013

(51) Int. Cl.
*G06F 15/16* (2006.01)
*H04L 12/58* (2006.01)
*H04L 29/08* (2006.01)

(52) U.S. Cl.
CPC .............. *H04L 51/32* (2013.01); *H04L 67/306* (2013.01); *H04L 51/22* (2013.01); *H04L 51/28* (2013.01)

(58) Field of Classification Search
CPC ... G06F 17/30575; H04L 67/04; H04L 51/24; H04L 51/32; H04L 29/08099; H04L 67/306
USPC ........................................................ 709/206
See application file for complete search history.

(56) References Cited

U.S. PATENT DOCUMENTS

| 6,405,319 | B1 * | 6/2002 | Arnold ................... H04L 63/18 380/278 |
| 8,285,656 | B1 * | 10/2012 | Chang ................. H04L 12/5875 706/15 |
| 8,972,400 | B1 * | 3/2015 | Kapczynski ...... G06F 17/30091 707/722 |
| 9,147,042 | B1 * | 9/2015 | Haller ................... G06F 19/328 |
| 2002/0049751 | A1 * | 4/2002 | Chen ...................... G06Q 30/06 |
| 2006/0047725 | A1 * | 3/2006 | Bramson ....................... 707/204 |
| 2009/0119299 | A1 * | 5/2009 | Rhodes ............................ 707/9 |
| 2009/0122339 | A1 * | 5/2009 | Nakamura ................... 358/1.15 |
| 2009/0147771 | A1 * | 6/2009 | Seal et al. ..................... 370/352 |
| 2012/0191855 | A1 * | 7/2012 | Alexander ................... 709/225 |

(Continued)

OTHER PUBLICATIONS

"International Application Serial No. PCT/IN/2013/000732, International Search Report mailed May 22, 2014".

(Continued)

*Primary Examiner* — Kevin Bates
*Assistant Examiner* — Ronak Patel
(74) *Attorney, Agent, or Firm* — Schwegman Lundberg & Woessner, P.A.

(57) ABSTRACT

In various example embodiments, a system and method for managing contacts in a network are provided. In example embodiments, a value added by a user to a first contact in an address book of the user is detected. The first contact corresponds to an individual. A determination is made as to whether the value exists in a primary profile of the individual. Based on the value not existing in the primary profile, an assessment is made as to whether the individual previously deleted the value from the primary profile or the individual did not verify a previous notification for the same value. Based on the value not being previously deleted or not verified, a notification is provided to the individual that includes an option to verify the value.

20 Claims, 6 Drawing Sheets

(56) References Cited

U.S. PATENT DOCUMENTS

| | | | |
|---|---|---|---|
| 2012/0203821 A1* | 8/2012 | Czajka | 709/203 |
| 2013/0060853 A1* | 3/2013 | Kim | H04W 4/08 709/204 |
| 2013/0110776 A1* | 5/2013 | Nunez Diaz et al. | 707/624 |
| 2013/0110907 A1* | 5/2013 | Sherwin et al. | 709/203 |
| 2013/0297604 A1* | 11/2013 | Sutedja et al. | 707/737 |
| 2014/0089439 A1* | 3/2014 | Dumpeti | G06Q 10/10 709/206 |

OTHER PUBLICATIONS

"International Application Serial No. PCT/IN/2013/000732, Written Opinion mailed May 22, 2014".

* cited by examiner

SYSTEM AND METHOD FOR CONTACT MANAGEMENT IN A NETWORK

PRIORITY APPLICATION(S)

This application claims the benefit of priority under 35 U.S.C. §119(a)-(d) to Indian Application No. 1132/MUM/2013, filed Mar. 26, 2013, and titled "*System and Method for contact Management in a Network*," which is incorporated herein by reference in its entirety.

FIELD

The present disclosure relates generally to management of address books, and in a specific example embodiment, to providing contact management in a network.

BACKGROUND

Typically, a user may have a plurality of contact mechanisms that enable the user to be reachable via multiple networks. For example, the user may have a Facebook account, a Gmail account, and a mobile number. Social contacts of the user (e.g., friends, colleagues) may have address books that contain one or more of the contact mechanisms (e.g., contact entries) for the user. However, each of these social contacts must maintain and update their contact information for the user. Because it is such a tedious process, many social contacts do not bother updating their address books as often as they should.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for contact management in a network. In example embodiments, a value added by a user to a first contact in an address book of the user is detected. The first contact corresponds to an individual that may be socially connected to the user. A determination is made as to whether the value exists in a primary profile of the individual. Based on the value not existing in the primary profile, an assessment is made as to whether the individual previously deleted the value from the primary profile or whether the individual did not verify a previous notification for the same value. Based on the value not being previously deleted or not verified, a notification is provided to the individual that includes an option to verify the value. If the individual verifies the value, the value is added to the profile of the individual. Additionally, the value may be automatically transmitted to a permission set of users (e.g., social contacts) that the individual indicates should receive the value.

By using embodiments of the present invention, contacts in address books may be automatically updated without user intervention. Accordingly, one or more of the methodologies discussed herein may obviate a need for manual user input in order to update a contact in the address book. This may have the technical effect of reducing computing resources used by one or more devices within the system. Examples of such computing resources include, without limitation, processor cycles, network traffic, memory usage, storage space, and power consumption.

Figure 1:
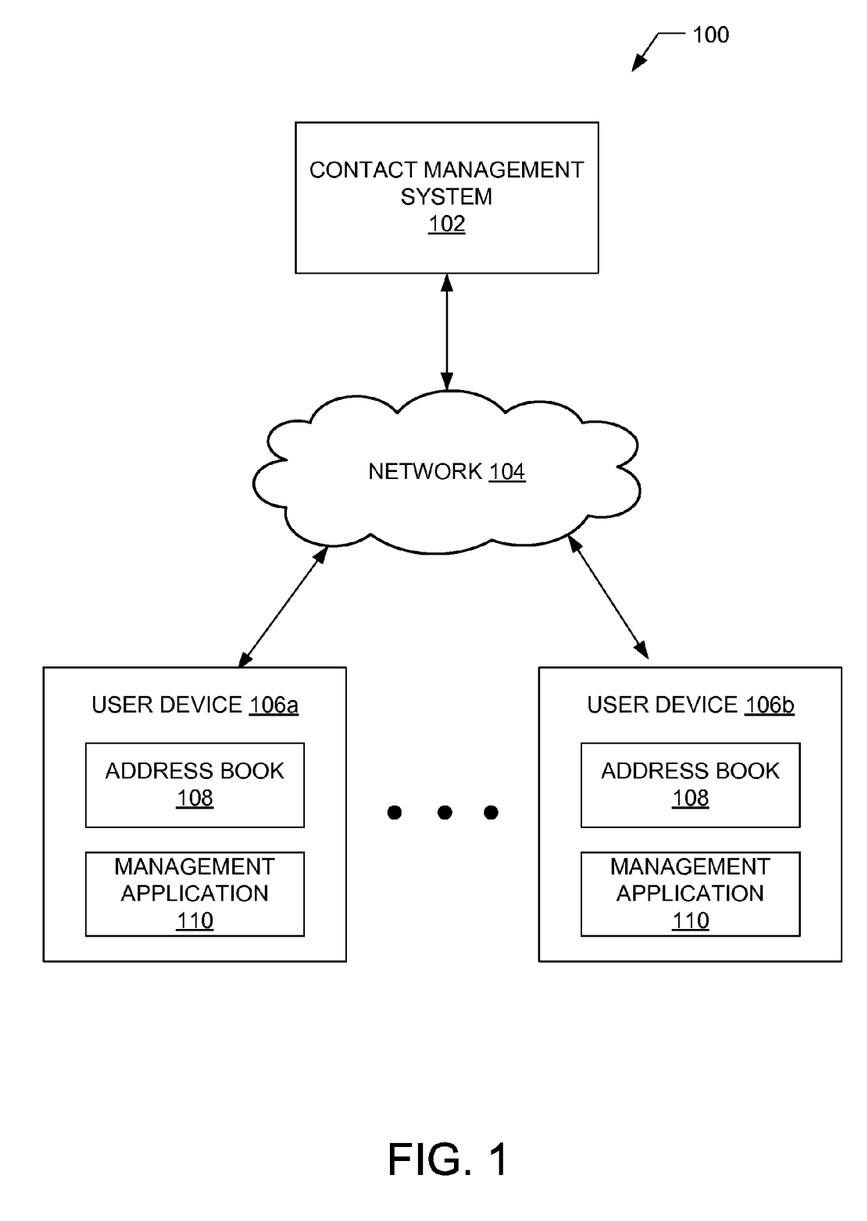
FIG. 1 is a diagram illustrating an example environment in which embodiments of a system for managing contacts in a network may be implemented.

With reference to FIG. 1, a diagram illustrating an example environment 100 in which embodiments of a system for contact merge management is shown. The environment 100 comprises a contact management system 102 coupled via a network 104 (e.g., the Internet, wireless network, cellular network, or a Wide Area Network (WAN)) to a plurality of user devices 106 comprised of a user device 106*a*, a user device 106*b*, and the like. Each user device 106 is associated with a user that maintains an address book 108 in their user device 106. The user device 106 may comprise a mobile phone, laptop, tablet, or any other communication device that a user may utilize to store and manage the address book 108. The address book 108 comprises a data store of contact information for the user. The address book 108 is a contact list having a plurality of contacts (e.g., entries in the address book 108) whereby each contact contains one or more values (e.g., address, e-mail, phone number) that enable communication with an individual of the entry. It is noted that the terms "address book" and "contact list" may be used interchangeably.

Example embodiments provide a management application 110 that is provisioned from the contact management system 102 to the user device 106. Once the management application 110 is activated on the user device 106, the management application 110 may exchange information with the contact management system 102. In example embodiments, the management application 110 may notify the contact management system 102 when a new value is added to a contact in the address book 108. Additionally, the management application 110 may receive new values that are confirmed by the individual that is used to update the contact for the individual in the address book 108.

It is noted that the environment 100 shown in FIG. 1 is exemplary. Example alternative embodiments may comprise any number of contact management systems 102 and user devices 106 in communication in the environment 100.

Figure 2:
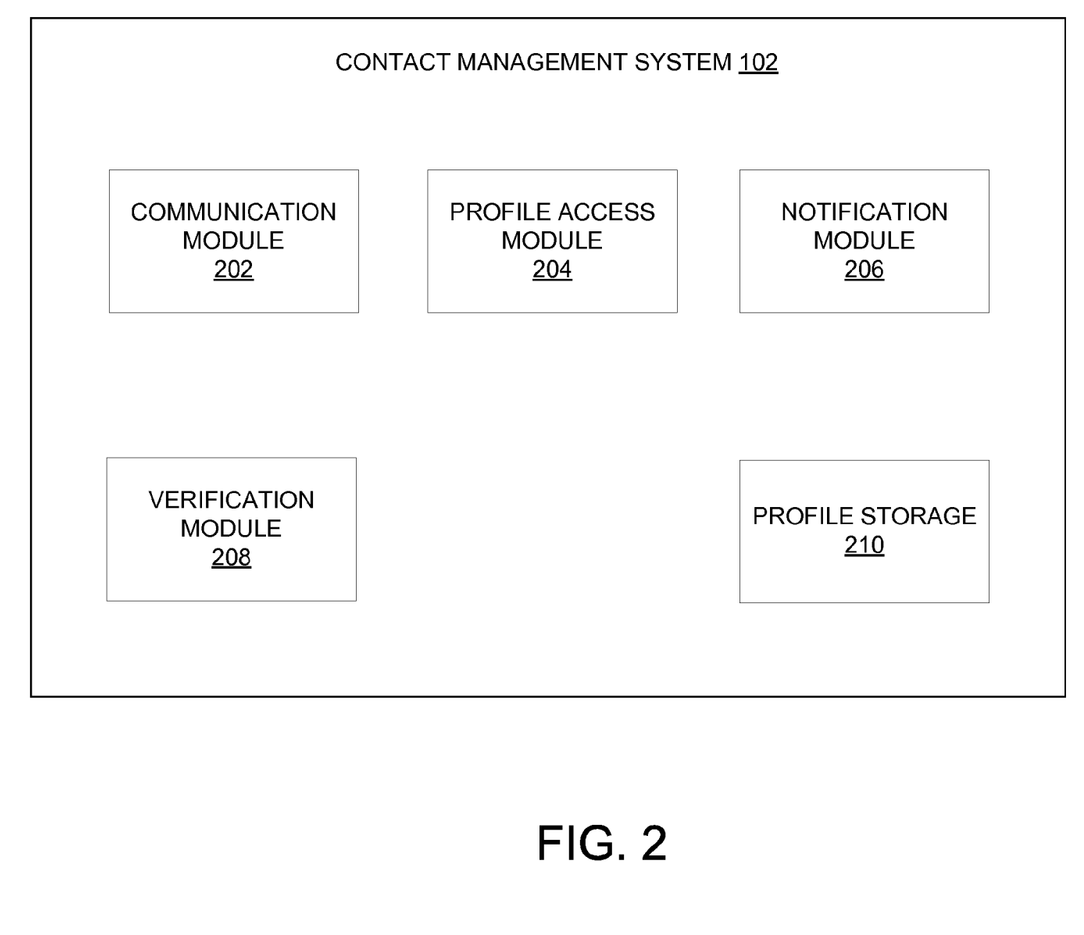
FIG. 2 is a block diagram illustrating an example embodiment of a contact management system.

Referring now to FIG. 2, a block diagram illustrating an example embodiment of the contact management system 102 is shown. The contact management system 102 provides the management application 110 to the user devices 106 and manages the contacts in the network. To enable these operations, the contact management system 102 comprises a communication module 202, a profile access module 204, a notification module 206, a verification module 208, and a profile storage 210 coupled in communication. Alternative embodiments may comprise more, less, or other modules for managing contacts in the network.

The communication module 202 exchanges information with the various user devices 106. In example embodiments, the communication module 202 receives an indication of a new value that is added to a contact corresponding to an individual in an address book of a user (e.g., from the user device 106 of the user). The communication module 202 may also send notifications to and receive verification from the individual regarding the new value. In some embodiments, the individual may also provide instructions or indications as to which other users should automatically receive the new value in order to update their respective address books.

The profile access module 204 determines whether the new value exists in a profile that is maintained in the profile storage 210 for the individual. As such, the profile access module 204 accesses the profile for the individual in the profile storage 210. Once accessed, the profile access module 204 determines if the new value that is entered by the user exists in the profile for the individual. If the new value exists in the profile, in some embodiments, the communication module 202 may provide instructions to the management application 110 of the user device 106 of the user to mark the new value as being verified.

If the new value does not exist in the profile, the profile access module 204 may determine whether the new value was previously in the profile but deleted by the individual or whether the new value never existed in the profile. If the new value had been previously deleted by the individual, then the profile access module 204 will not provide any notification to the individual. In these cases, the new value may remain "unverified" in the user's address book. However, if the new value never was associated with the profile of the individual, nor was it sent to the individual in the past for a verification, a notification may be sent to the individual to confirm the new value.

The notification module 206 manages the notifications to the individual. Thus, if a new value is added by a user to their address book for the contact of the individual and the new value does not exist in the profile for the individual stored in the profile storage 210, the notification module 206 may send a notification to the individual requesting the individual confirm or verify the new value. The notification may be sent by any means based on contact information (e.g., values) stored in the profile of the individual. For example, the notification may be sent via e-mail if an e-mail address exists in the profile for the individual or sent via text messaging if a mobile phone number exists in the profile for the individual or via a chat message.

However, there may be some embodiments where the notification may not be sent. For example, the notification module 206 may detect that a plurality of users have added the new value to their respective address books. The notification module 206 then determines a threshold number of notifications to be sent to the individual within a predetermined time period, and may delay (or prevent) providing any further notifications to the individual based on the threshold being surpassed. Alternatively, if the individual already has an outstanding notification for the same new value, a further notification may not be sent.

The verification module 208 manages verifications of new values by the individual. When the individual responds to the notification by confirming the new value, the confirmation is passed to the verification module 208 by the communication module 202. The verification module 208 then updates the profile for the individual to include the new value. In some embodiments, the new value that is added by the user may be up marked as "verified" in the address book based on the confirmation.

Once the profile is updated, social contacts of the individual (e.g., friends, colleagues, family) may automatically receive the new value in order to update their address books with the contact information. In example embodiments, the individual may provide the verification module 208 with instructions as to which social contacts should automatically receive the new value. The instructions may be received at any time (e.g., before the notification, with the notification, or after the notification).

The profile storage 210 maintains profiles for all individuals registered with or using applications associated with the contact management system 102. Each individual has a profile in the profile storage 210 that the individual is responsible for managing. Information in the profile of the individual may be copied to address books of social contacts of the individual. By doing this, the social contacts may maintain updated contact information for the individual in their address book.

Figure 3:
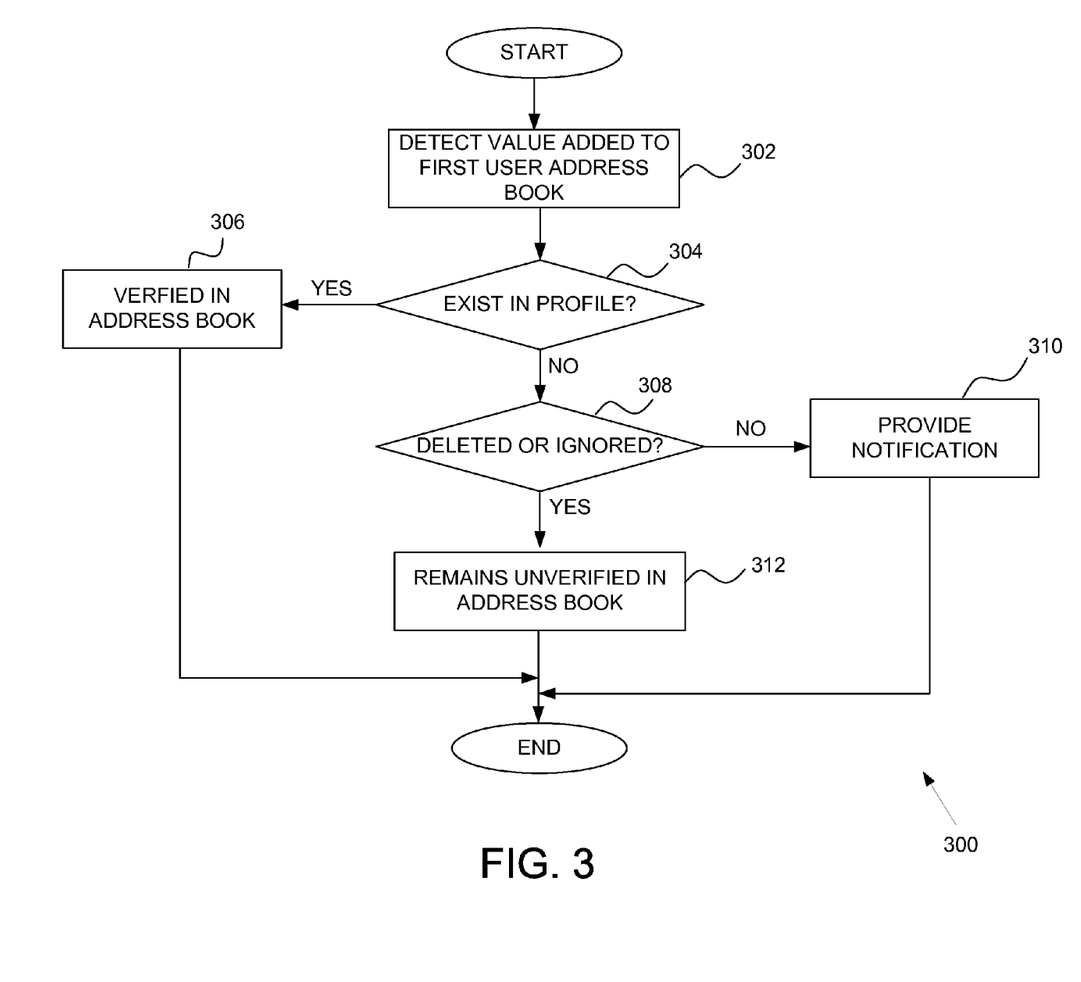
FIG. 3 is a flow diagram of an example a method for managing contacts in a network.

FIG. 3 is a flow diagram of an example a method for managing contacts in the network. In example embodiments, a user adds a new value to a (first) contact in their address book. For example, a first user may add a new mobile number for a second user. In some embodiments, the new value is added by a merge of a second contact into the first contact in the address book of the user. In operation 302, the communication module 202 detects that a new value has been added to the address book of the first user. In some embodiments, the communication module 202 detects the new value by receiving an indication of the new value from the management application 110 of the user device 106 of the first user.

In operation 304, a determination is made as to whether the new value exists in the profile for the individual. In example embodiments, the profile access module 204 accesses the profile for the individual in the profile storage 210. In some embodiments, the contact in the address book is determined to correspond to the individual based on a second value in the contact that is also contained in the profile of the individual that uniquely identifies the individual. The second value may be any one of an e-mail address, a mobile number, a chat account, a handle, a telephone number, or a social network identifier. The profile access module 204 then determines whether the new value exists. If the new value exists in the profile, the new value is verified in operation 306. Accordingly, the communication module 202 may send instructions to the management application 110 to mark the new value as "verified" in the address book of the first user.

If the value does not exist in the profile, then in operation 308, the profile access module 204 determines whether the value was previously deleted from the profile, whether previous notifications were ignored by the individual, or whether the notification was unconfirmed. If the value was not previously deleted and notifications not previously ignored or unconfirmed, then a notification is provided in operation 310 by the notification module 206. However, if the value was previously deleted or prior notifications for the same value ignored or unconfirmed, then the value may remain unverified in the address book of the first user in operation 312. In some cases, the notification module 206 may provide a reminder notification if the individual has ignored the previous notification past a timing threshold (e.g., after 1 week).

Figure 4:
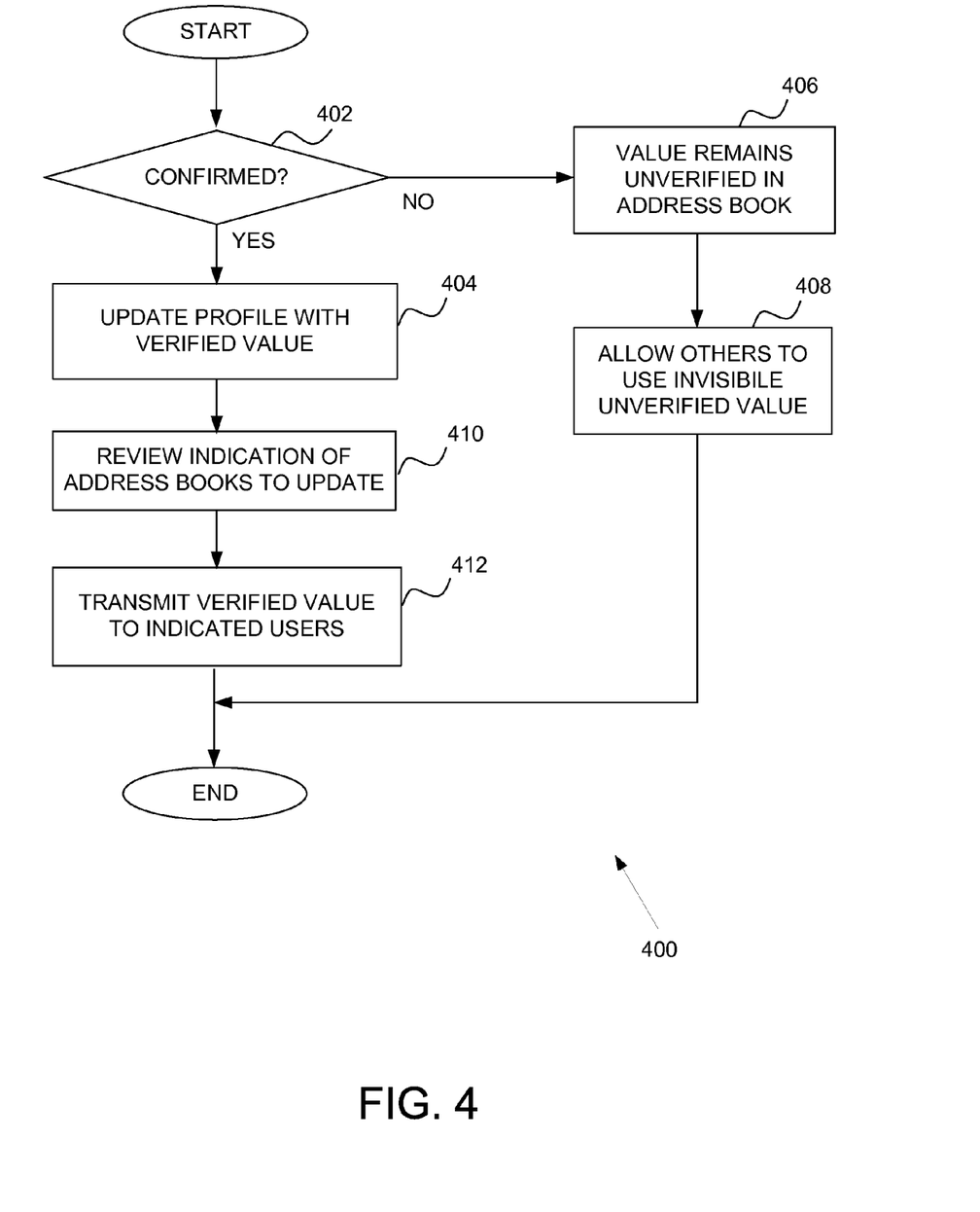
FIG. 4 is a flow diagram of an example method for managing verification of an added value.

FIG. 4 is a flow diagram of an example method 400 for managing verification of an added value. As discussed in FIG. 3, if the value was not previously deleted and notifications not previously ignored or unconfirmed, then a notification is provided in operation 310 by the notification module 206 to the individual. The individual then may provide a response to the notification. In operation 402, a determination is made as to whether the response is a confirmation/verification of the value. If the value is verified in operation 402, then the profile for that individual is updated with the verified value in operation 404.

However, if the value is not verified by the individual, then the value remains unverified in the address book of the first user in operation 406. In these embodiments, the contact management system 102 may still allow the use of the unverified value by others in operation 408. In some cases, the value may be "invisible" but usable. For example, assume a first user enters a new mobile number (e.g., a new value) for a second user. A third user also has a contact for the second user in their address book but does not have the mobile number for second user in the address book. Because the mobile number is unverified, the mobile number of the second user cannot be shown or given to the third user (that the first user has entered). However, the contact management system 102 may notify the third user that a mobile number for the second user exists, and that the third user can send a text message to the second user that is accepted by the contact management system 102. The contact management system 102 may then relay the text message to the second user on behalf of the third user without displaying the mobile number to the third user. As such, the third user may be notified that an unverified value exists but is not provided with the unverified value. This process provides a way to use the unverified value before the second user has the chance to verify the value. While a mobile number was discussed in this example, the same process may be applied to an e-mail address.

In embodiments where the profile is updated with the verified value, an indication of address books to update is reviewed in operation 410. The indication identifies social contacts of the individuals (via a permission setting) that should automatically receive the verified value in order to update their respective address books. The indication may be received at any time. For example, the individual may have set the permission setting prior to receiving the notification, or the individual may set the permission setting at the same time that a response to the notification is sent. The permission setting may comprise an indication to automatically send the verified value to, for example, anyone, no one, friends, a specific list of users, or a set of domain names. In operation 412, the verified value is transmitted to the indicated users specified in operation 410.

Figure 5:
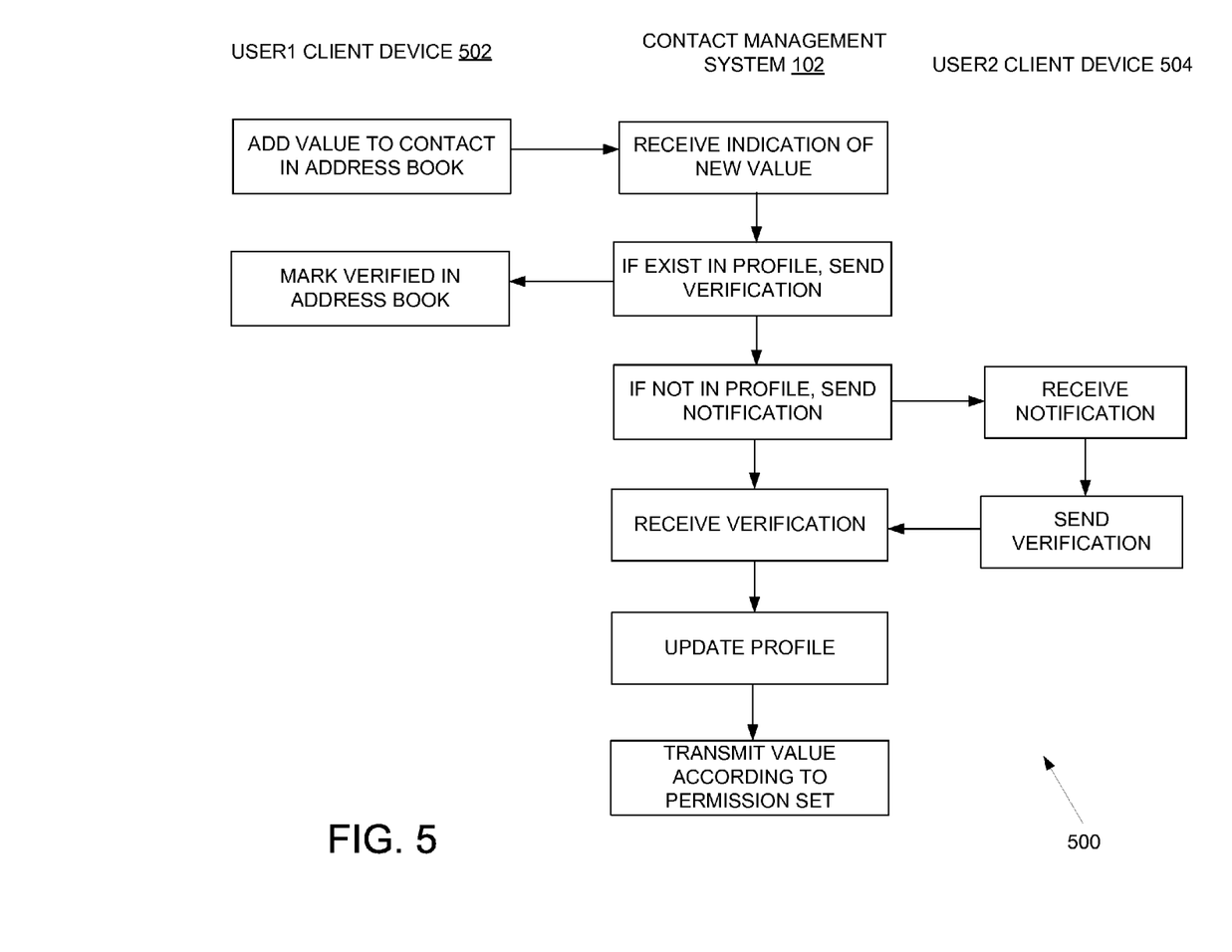
FIG. 5 is a communication flow diagram of an example method for managing contacts in the network.

FIG. 5 is a communication flow diagram of an example method 500 for managing contacts in the network. User 1 at client device 502 adds a new value to a contact corresponding to an individual (user2) in user1's address book. The new value is sent to the contact management system 102. Once received, the contact management system 102 determines if the value exists in the user2's profile at the contact management system 102. If the value exists, then instructions are sent to the client device 502 to mark the value as verified in the address book.

However, if the value is not in the profile, a notification may be sent to user2 at client device 504. The determination as to whether the notification should be sent may be based on several factors. For example, if user2 has previously deleted the value or has not confirmed the value in the past, then no notification may be sent. If the notification is sent, user2 may send a verification response back to the contact management system 102. Upon receiving the verification, the contact management system 102 updates the profile for user2 at the contact management system 102. Additionally, the verified value may be transmitted to update address books according to a permission set of indicated users and social contacts.

Figure 6:
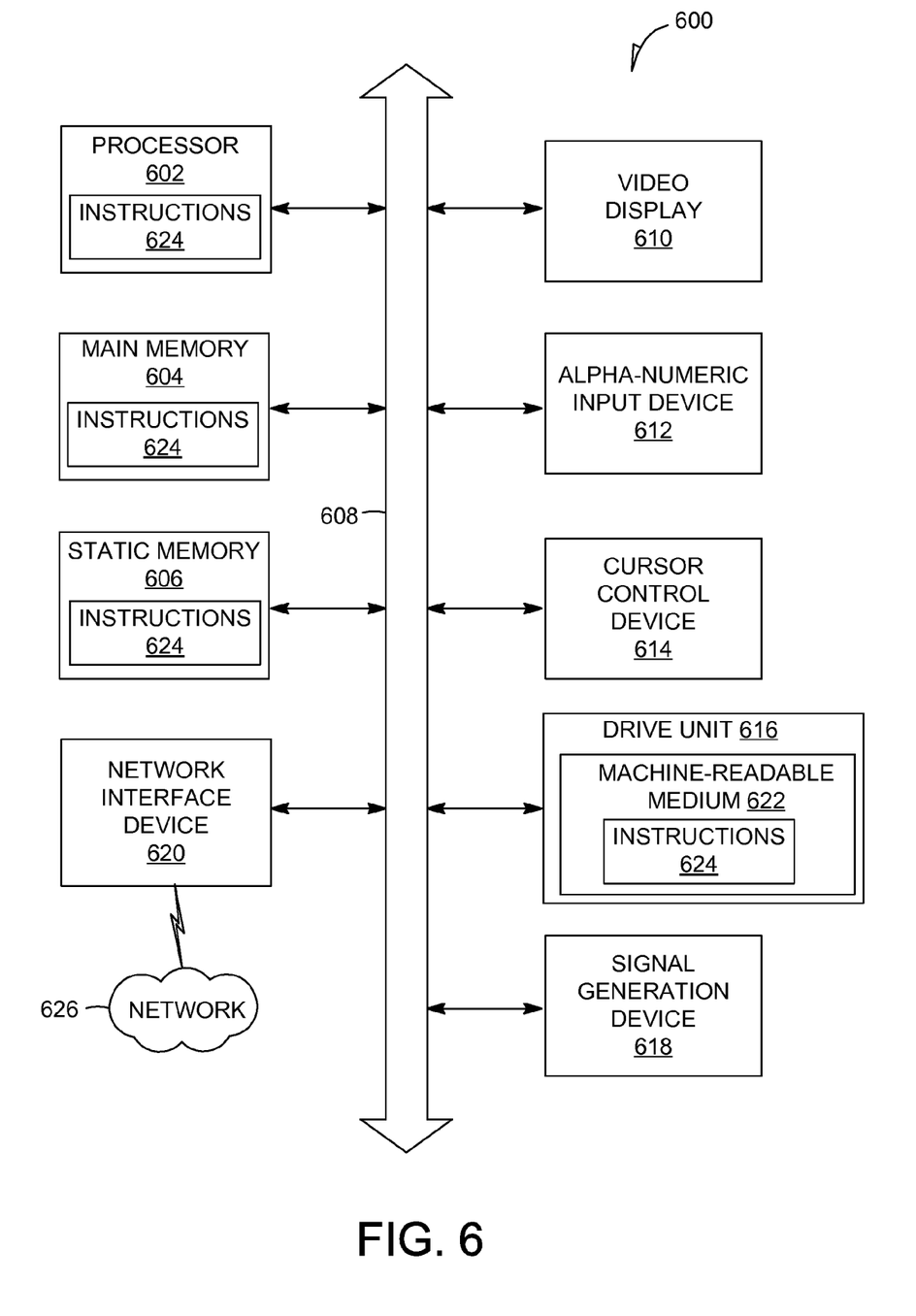
FIG. 6 is a simplified block diagram of a machine in an example form of a computing system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alpha-numeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   detecting, by a contact management system, a value added by a user to a first contact in an address book maintained on a user device of the user, the first contact corresponding to an individual that is different from the user;
   determining whether the value exists in a primary profile of the individual maintained in a profile storage of the contact management system;
   based on the value not existing in the primary profile of the individual, assessing, using a processor of the content management system, whether the individual previously deleted the value from the primary profile of the individual and whether the individual previously declined to verify the value in response to a previous notification; and
   based on the value not being previously deleted and the individual not having previously declined to verify the value, providing a notification, by the content management system to the individual, that includes an option for the individual to verify the value.

2. The method of claim 1, further comprising updating the primary profile of the individual maintained in the profile storage of the contact management system to include the value in response to the individual verifying the value.

3. The method of claim 2, further comprising automatically transmitting the value that updated the primary profile to address books maintained on user devices of socially connected users to which the individual is connected.

4. The method of claim 1, further comprising receiving, from the individual, an indication of which other users are to be automatically provided the value, the indication comprising a permissions setting.

5. The method of claim 4, wherein the permissions setting comprises a selection from the group consisting of anyone, no one, friends, a specific list of users, and a set of domain names.

6. The method of claim 4, further comprising automatically transmitting the value to address books maintained on user devices of the other users indicated by the individual in the permissions setting.

7. The method of claim 1, further comprising determining that the first contact in the address book corresponds to the individual based on a second value in the first contact that is also contained in the primary profile of the individual maintained in the profile storage of the contact management system and which uniquely identifies the individual.

8. The method of claim 7, wherein the second value is a selection from the group consisting of an e-mail address, a mobile number, a chat account, a handle, a telephone number, and a social network identifier.

9. The method of claim 1, wherein the value is added to the first contact by a merge of a second contact into the first contract in the address book maintained on the user device of the user.

10. The method of claim 1, wherein the providing of the notification to the individual is performed via at least one of a chat message, a text, or an e-mail.

11. The method of claim 1, further comprising maintaining the value as unverified in the first contact in the address book maintained on the user device of the user until the individual verifies the value.

12. The method of claim 11, further comprising allowing other users in a network to communicate with the individual using the unverified value without providing the unverified value to the other users.

13. The method of claim 12, wherein the allowing of other users to communicate with the individual using the unverified value occurs based on a minimum number of users having added the value for the individual to their respective contacts.

14. A machine-readable storage medium having no transitory signals and storing instructions which, when executed by the at least one processor of a machine, cause the machine to perform operations comprising:
   detecting a value added by a user to a first contact in an address book maintained on a user device of the user, the first contact corresponding to an individual that is different from the user;

determining whether the value exists in a primary profile of the individual maintained in a profile storage of a contact management system;

based on the value not existing in the primary profile of the individual, assessing whether the individual previously deleted the value from the primary profile of the individual and whether the individual previously declined to verify the value in response to a previous notification; and based on the value not being previously deleted and the individual not having previously declined to verify the value, providing a notification to the individual that includes an option for the individual to verify the value.

15. The machine-readable storage medium of claim 14, wherein the operations further comprise updating the primary profile of the individual maintained in the profile storage of the contact management system to include the value in response to the individual verifying the value.

16. The machine-readable storage medium of claim 15, wherein the operations further comprise automatically transmitting the value that updated the primary profile to address books maintained on user devices of socially connected users to which the individual is connected.

17. The machine-readable storage medium of claim 14, wherein the operations further comprise receiving, from the individual, an indication of which other users are to be automatically provided the value, the indication comprising a permissions setting.

18. The machine-readable storage medium of claim 14, wherein the operations further comprise determining that the first contact in the address book corresponds to the individual based on a second value in the first contact that is also contained in the primary profile of the individual maintained in the profile storage of the contact management system and which uniquely identifies the individual.

19. A system comprising:

one or more processors of a machine configured to, at least:

detect a value added by a user to a first contact in an address book maintained on a user device of the user, the first contact corresponding to an individual that is different from the user;

determine whether the value exists in a primary profile of the individual maintained in a profile storage of a contact management system;

assess whether the individual previously deleted the value from the primary profile of the individual and whether the individual previously declined to verify the value in response to a previous notification based on the value not existing in the primary profile of the individual; and provide a notification to the individual that includes an option for the individual to verify the value based on the value not being previously deleted and the individual not having previously declined to verify the value.

20. The system of claim 19, wherein the one or more processors is further configured to update the primary profile of the individual maintained in the profile storage of the contact management system to include the value in response to the individual verifying the value.

\* \* \* \* \*